(12) United States Patent
Balas

(10) Patent No.: US 11,815,070 B1
(45) Date of Patent: Nov. 14, 2023

(54) ENERGY CONVERTING DEVICE

(71) Applicant: Yaniv Balas, Herzliya (IL)

(72) Inventor: Yaniv Balas, Herzliya (IL)

( * ) Notice: Subject to any disclaimer, the term of this patent is extended or adjusted under 35 U.S.C. 154(b) by 0 days.

(21) Appl. No.: 18/317,515

(22) Filed: May 15, 2023

(30) Foreign Application Priority Data

Aug. 23, 2022 (IL) .......................................... 295845

(51) Int. Cl.
*F03G 3/00* (2006.01)
(52) U.S. Cl.
CPC .......... *F03G 3/087* (2021.08); *F05B 2210/12* (2013.01); *F05B 2220/706* (2013.01); *F05B 2270/606* (2013.01)
(58) Field of Classification Search
CPC ... F03G 3/00; F03G 3/087; F03G 7/10; F03G 7/125; F03B 17/02; F03B 17/025; F03B 17/04; F05B 2210/12; F05B 2220/707; F05B 2270/606
See application file for complete search history.

(56) References Cited

U.S. PATENT DOCUMENTS

| | | | | |
|---|---|---|---|---|
| 3,412,482 A | * | 11/1968 | Kusmer | F03B 17/04 434/300 |
| 4,363,212 A | * | 12/1982 | Everett | F03B 17/02 415/7 |
| 4,718,232 A | * | 1/1988 | Willmouth | F03B 17/04 290/1 R |
| 4,838,025 A | * | 6/1989 | Nelis | F03B 17/025 60/507 |
| 5,372,474 A | * | 12/1994 | Miller | F03B 17/005 74/84 R |
| 8,667,798 B2 | * | 3/2014 | Hopper | F03B 17/02 290/43 |
| 2008/0258471 A1 | | 10/2008 | Karim | |
| 2014/0042744 A1 | * | 2/2014 | Daya | F03B 17/025 192/41 R |
| 2014/0197642 A1 | * | 7/2014 | Daya | H02K 53/00 74/DIG. 9 |
| 2015/0280519 A1 | | 10/2015 | Bahamdain | |
| 2018/0156189 A1 | * | 6/2018 | Kohsaka | B62D 61/12 |
| 2018/0171964 A1 | * | 6/2018 | Chen | F03B 11/02 |
| 2018/0291866 A1 | | 10/2018 | Mohamed | |

FOREIGN PATENT DOCUMENTS

| | | | | |
|---|---|---|---|---|
| WO | WO-2004067953 A1 | * | 8/2004 | ............. F03B 17/04 |
| WO | WO-2011108383 A1 | * | 9/2011 | ............. F03B 13/06 |
| WO | WO-2013/098623 A1 | | 7/2013 | |
| WO | WO-2014105004 A1 | * | 7/2014 | ............. B63B 35/44 |

OTHER PUBLICATIONS

Israeli Office Action, Israeli Application No. 295845, dated Aug. 31, 2023.

* cited by examiner

*Primary Examiner* — Phillip A Johnson
(74) *Attorney, Agent, or Firm* — MARSHALL, GERSTEIN & BORUN LLP

(57) ABSTRACT

An energy converting device that includes a stationary vertical structure with a vertical post member, compressible and expandable containers containing "lighter-than-air" gas, and a supporting base that can vertically slide along the post member. A control mechanism is used to compress and decompress the gas within the containers, and the supporting base can move up or down depending on the compression state of the gas.

8 Claims, 5 Drawing Sheets

ENERGY CONVERTING DEVICE

FIELD OF INVENTION

The present invention relates to the field of energy converting systems. More particularly, the invention relates to an energy converting device based on the buoyancy principle and gravity force, providing high-efficiency capture, conversion, storage, and energy production.

BACKGROUND OF THE INVENTION

The promise of renewable energy has proved to be quite elusive. Despite the fact that a lot of research is devoted either by private entrepreneurs or by governmental institutions, renewable energy devices at their current stage of development produce only a slight fraction of the energy used worldwide.

For most renewable energy sources, efficiency is achieved on a large scale. This means that their efficiency is directly related to the amount of energy they produce. For instance, we may consider a single wind turbine, which converts energy to electrical output. However, efficiency can be significantly enlarged by having an entire wind farm with multiple wind turbines providing the same output. The main reason is that higher amounts of electrical power are more efficiently transported than small amounts. Generally, renewable power sources are remotely located from the area they serve. Thus, an efficient way to create and transfer electrical power is needed. Another aspect that must be considered is related to the renewable sources themselves. The energy losses of wind turbines due to friction are inversely proportional to the size of the turbine.

Moreover, the production of devices to harness renewable energy is often expensive to manufacture. Solar panels, for example, usually require rare earth metals that are expensive to acquire. Consequently, the energy savings must be significant to justify the cost of installing renewable energy devices.

Accordingly, there is a need for a renewable energy source that can produce a constant electrical output. In addition, there is a need in the art for a renewable energy source that works on a small scale, allowing it to be used "on site." Further, there is a need in the art for a renewable energy source that is cheap to manufacture.

It is an object of the present invention to provide a device that includes a gravitational/buoyancy component to maximize the conversion, transfer and storage of energy, streamline the design and increase overall system efficiency.

It is another object of the present invention to provide a system that is scalable in size and capacity.

Other objects and advantages of the invention will become apparent as the description proceeds.

SUMMARY OF THE INVENTION

An energy converting device comprising one or more containers filled with helium at standard conditions. These containers are held on a supporting base which is allocated at some height with respect to the ground. Initially, as is well known, helium is lighter than air, and the containers are held at a steady state without any energy investment by the user. We further compress the helium in the containers to make it heavier than air so that the containers fall under the gravity force. The gravitational energy, which is initially related to the release height of the containers, is converted to kinetic energy.

In one aspect, the present invention relates to an energy converting device comprising: a stationary vertical structure having a vertical post member, one or more containers filled with "lighter-than-air" gas (e.g., helium), and a supporting base adapted to hold the one or more containers, wherein said supporting base is configured to vertically slide along said post member, either in a downward or an upward direction with respect to a compressed state or decompressed state of the "lighter-than-air" gas.

In one aspect, during the compressed state, the one or more containers fall under the gravity force. During the decompressed state, a buoyancy force causes the one or more containers to move in the upward direction.

According to an embodiment of the invention, during the fall, the gravitational energy, which is initially related to the release height of the one or more containers, is converted to kinetic energy.

In one aspect, the device is configured to convert the kinetic energy obtained from the gravitational energy of the falling body into electrical energy.

DETAILED DESCRIPTION OF THE INVENTION

The above-mentioned and other features and objects of this invention and the manner of obtaining them will become more apparent. The invention itself will be better understood by reference to the following description of embodiments of the present invention taken in conjunction with the accompanying drawings.

According to an embodiment of the invention, the energy converting system is based on the following principles: The system comprises one or more containers filled with helium (or other "lighter-than-air" gas) at standard conditions. These containers are held on a supporting base which is allocated at some height with respect to the ground. Initially, as is well known, helium is lighter than air, and the containers are held at a steady state without any energy investment by the user. At some point, the helium is compressed in the containers to make it heavier than air, so the containers fall under the gravity force. During the fall, the gravitational energy, which is initially related to the release height of the containers, is converted to kinetic energy. In one aspect, the system is configured to convert the kinetic energy obtained from the gravitational energy of the falling body into electrical energy. At the end of the fall, the helium is decompressed, and accordingly, a generated buoyancy force causes the containers to move upward.

Figure 3A:
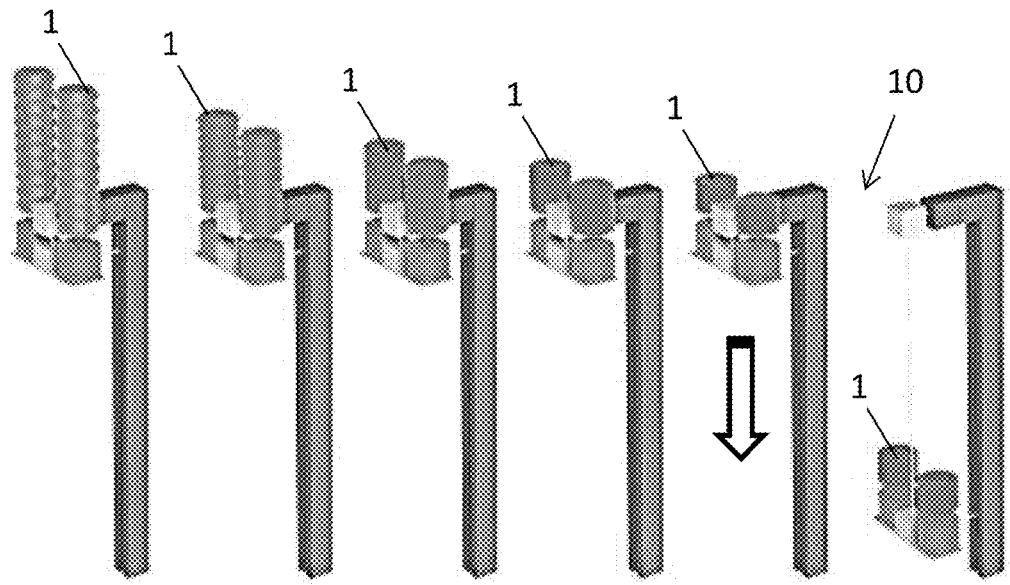
FIG. 3A schematically illustrates a perspective view of the energy converting device of FIG. 1 gravitationally falls in a downward direction, when the helium is compressed, according to an embodiment of the invention.
Figure 3B:
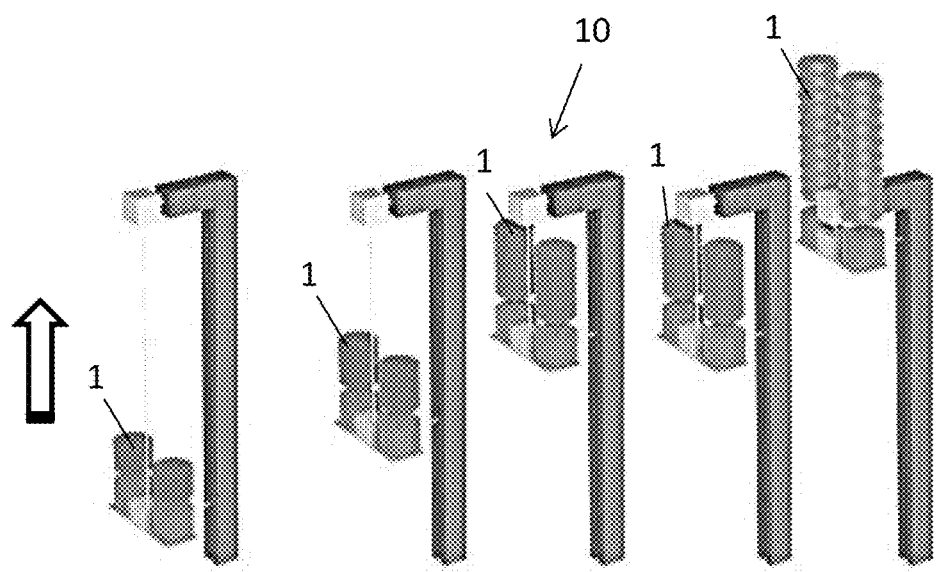
FIG. 3B schematically illustrates a perspective view of the energy converting device of FIG. 1 moves in an upward direction, when the helium is decompressed, according to an embodiment of the invention.

According to an embodiment of the invention, the gas can be completely compressed at the uppermost location of the one or more containers (i.e., at about the top region of the vertical post member, as demonstrated in FIG. 3A), while the decompression may take place at the lowermost location of the containers (i.e., at about the bottom region of the vertical post member, as demonstrated in FIG. 3B).

Figure 1:
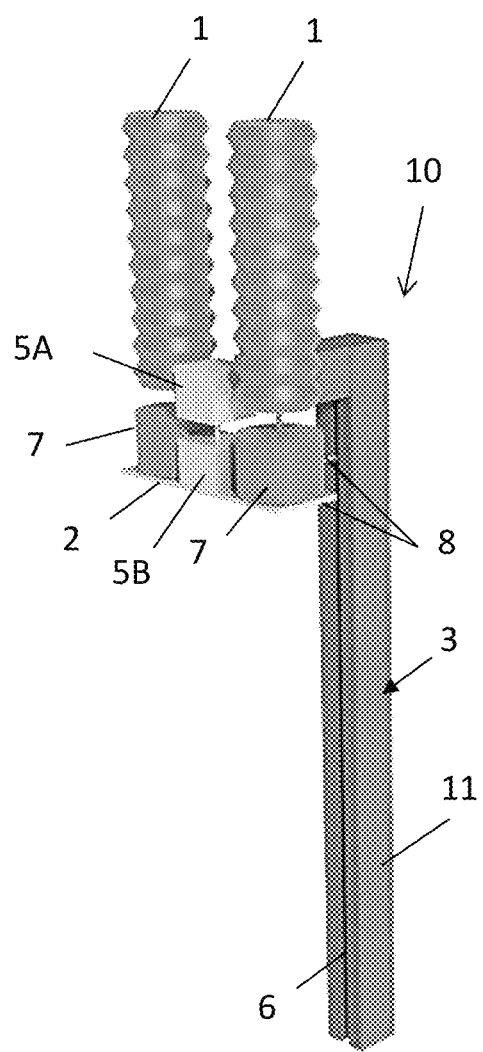
FIG. 1 schematically illustrates a perspective view of an energy converting device at an uppermost position, according to an embodiment of the invention.
Figure 2:
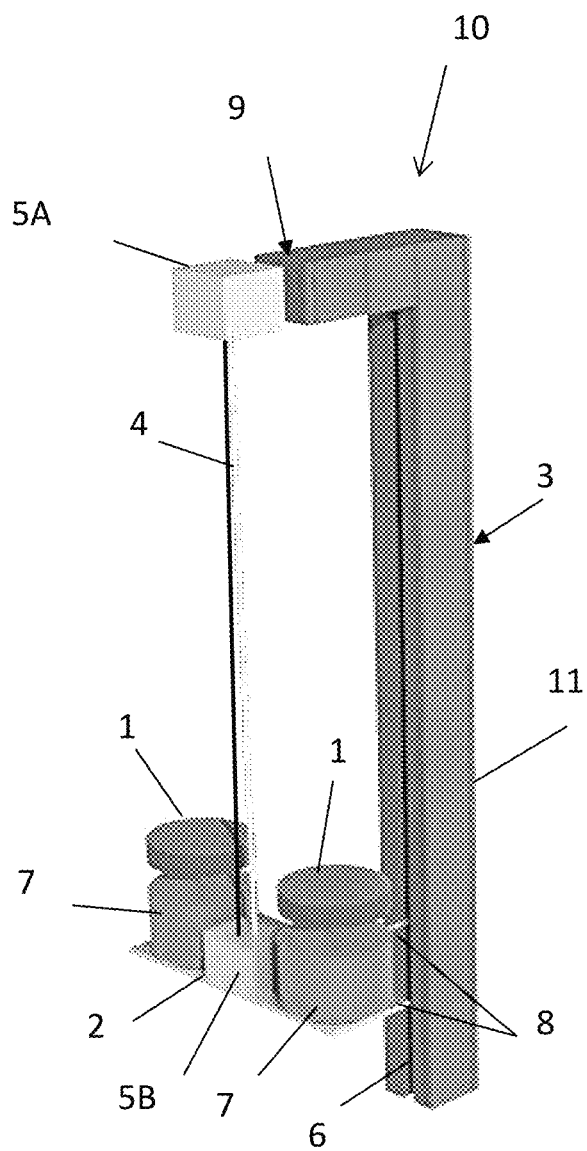
FIG. 2 schematically illustrates a perspective view of the energy converting device of FIG. 1 at about its lowermost position.

FIGS. 1, 2 and 3A schematically illustrate various stages of an energy converting device (10) during its operation process in a downward direction, according to an embodiment of the invention. FIG. 3B schematically illustrates various stages of energy converting device (10) during its operation process in an upward direction, according to an embodiment of the invention. Energy converting device (10) comprises a stationary vertical structure (3), one or more containers (1) filled with "lighter-than-air" gas (e.g., helium), a supporting base (2) adapted to hold the one or more containers 1, a spool-like arrangement that includes an upper member (5A), a lower member (5B) and a cable (4) that work together to enable the extension or retraction of cable (4) with respect to the movement direction of the containers (i.e., cable (4) extends when containers (1) fall down or retracts in the opposite direction when containers (1) move upward). The lower member (5B) connects cable (4) to the supporting base (2), and the upper member (5A) connects cable (4) to an upper section (9) of stationary vertical structure (3). The downward and upward direction of the motion of the one or more containers (1) is indicated by the arrows in FIGS. 3A and 3B, respectively.

According to an embodiment of the invention, FIG. 1 shows the energy converting device (10) at its initial upper position. In this embodiment, device (10) consists of several containers (1) filled with helium at standard conditions. These containers are held on supporting base (2) attached to cable (4) some height with respect to the ground (or to the surface on which the energy converting device (10) is installed). The cable (4) is connected to stationary vertical structure (3) by the use of a solid block (5A) at some height with respect to the ground (or to the surface on which the energy converting device (10) is installed). Cable (4) can move either upwards or downwards according to different stages of the device (10).

From a physical point of view, helium is well known to be lighter than air. Thus, the containers (1) are held at a steady state on the supporting base (2) without any energy investment by the user.

FIG. 3A shows different positions of the energy converting device (10) during its movement downwards (i.e., when containers (1) gravitationally fall). The movement downward is reached once the helium is compressed in the containers (1). Due to the compression, the helium reaches a state where it is heavier than air so that the containers (1) fall under the gravity force, and this force is converted to kinetic energy.

At the end of the movement, the containers (1) may reach their lowermost position with respect to device (10). In FIG. 2, we schematically represent the respective view of the energy conversion device (10) at its lowermost position. At this stage, the energy converter can be configured to convert the kinetic energy obtained from the gravitational force of the falling body into electrical energy.

Once the desired lowermost position of the device (10) is reached (e.g., as shown in FIG. 2), the helium is decompressed back in the containers (1) so that the initial state of the helium is reached. At this state, the helium is lighter than air, and due to the buoyancy force which overcomes gravity, the containers (1) initiate their movement directing upward till their reach the uppermost position of the stationary vertical structure (3), which FIG. 1 represents. The movement upward of containers (1) schematically shown in FIG. 3B.

The procedure described above is repeated periodically, and energy storage can be initiated at the end of each period.

According to an embodiment of the invention, during the upward and downward movement, supporting base (2) slides up and down, respectively, along a rail (6) located at a vertical post member (11) of stationary vertical structure (3). For example, supporting base (2) may include a sliding arrangement (8) that is adapted to slide along rail (6). During the fall, the gravitational energy, which is initially related to the release height of the containers, is converted to kinetic energy. Furthermore, the energy converter is configured to convert the kinetic energy obtained from the gravitational energy of the falling body into electrical energy.

According to an embodiment of the invention, each of the one or more containers (1) is a compressible and expandable container adapted to support a liquid/gas. In this embodiment, each container is connected to a gas compressing arrangement (7) that is configured to compress/decompress the gas within containers 1. As will be appreciated by a person skilled in the art, the compression/decompression of the gas within containers (1) can be performed by using a variety of electro-mechanical/mechanical mechanisms that are connected to containers (1) to control the compression and expansion of each container (1). For example, the gas compressing arrangement (7) may comprise a pump adapted to compress the gas into an inner chamber, or a cable arrangement located within each container (1) that is adapted to physically control the compression/expansion of the container, a combination of both, or any other arrangement suitable to force/control the compression/expansion capabilities of the containers (1).

According to an embodiment of the invention, the compression and expansion timing can be controlled by a control unit configured to send command/signals suitable to control the operation of the gas compressing arrangement (7).

Figure 4:
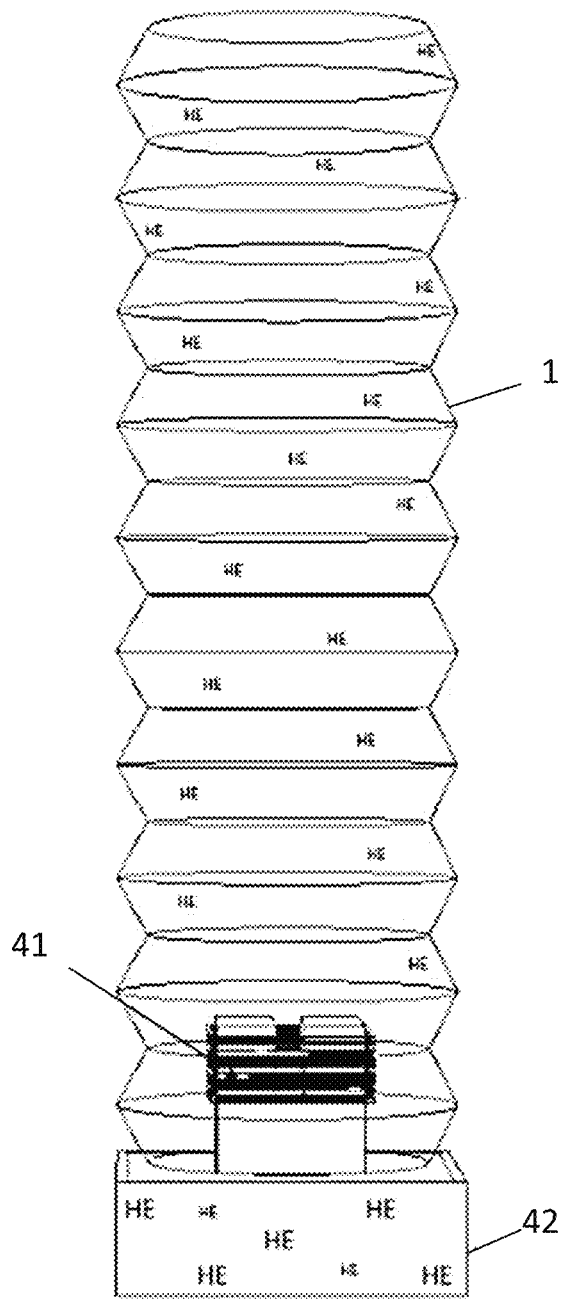
FIG. 4 schematically illustrates an implementation of a gas compressing arrangement, according to an embodiment of the invention.

FIG. 4 schematically illustrates an implementation of gas compressing arrangement (7) as a mechanical gas compressing arrangement, according to an embodiment of the invention. The mechanical gas compressing arrangement comprises a mechanical device such as a compressor (41) (or a pump-based arrangement) with a compressed gas storage chamber (42). In this embodiment, the compressor (41) is located at the inner bottom of the container (1), and it is used for storing the compressed gas and releases it whenever needed according to the operation stage of device (10). The combination of compressor (41) with the compression and expansion capabilities of container (1) enables controlling the compression and expansion of container (1).

Figure 5:
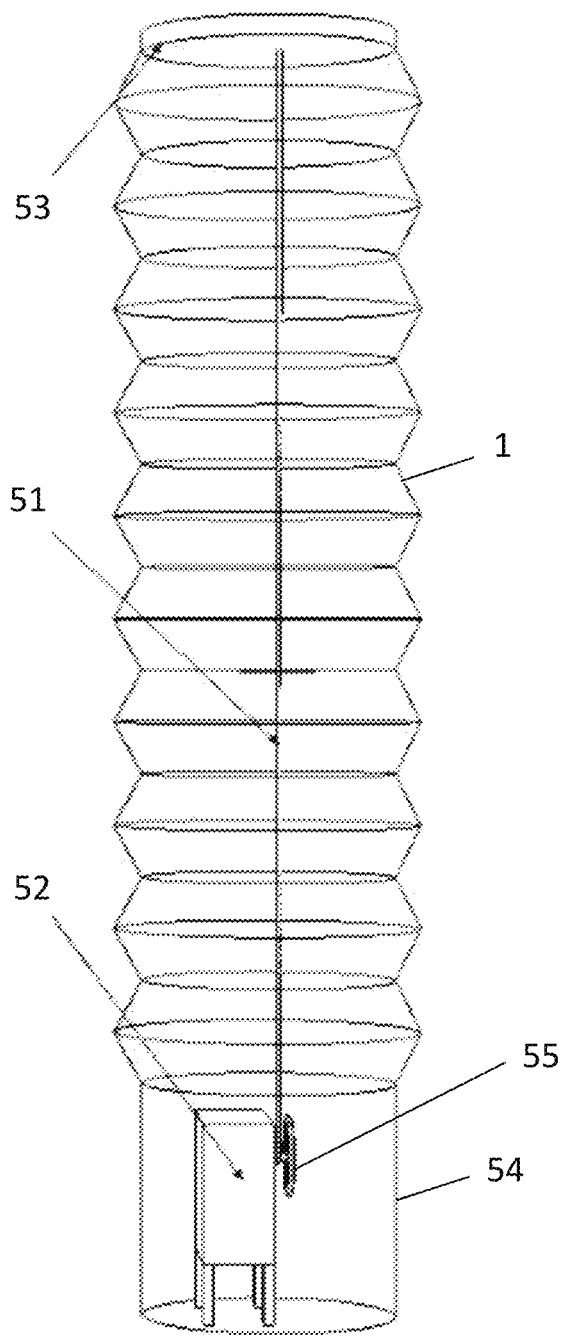
FIG. 5 schematically illustrates a cable arrangement to physically control the compression/expansion of a container, according to an embodiment of the invention.

FIG. 5 schematically illustrates a cable arrangement to physically control the compression/expansion of a container, according to an embodiment of the invention. The cable arrangement is located within each container and is adapted to physically control the compression/expansion of the container to force/control the compression/expansion of the gas. The cable arrangement comprises a cable 51, an electric motor 52, and a pulley system 55 to support movement and change of direction of cable 51.

According to an embodiment of the invention, an electric motor and pulley system is an effective way to control and support the movement and change of direction of a taut cable, such as cable 51. Electric motor 52 provides the necessary rotational force, which is transmitted through pulley 55 to cable 51. Cable 51 may wound around pulley 55, and as motor 52 rotates pulley 55, cable 51 moves in the desired direction. The tension and alignment of cable 51 are critical to the proper functioning of the device (10), and additional pulleys or guides may be used to ensure that cable 51 is properly directed, such as the use of a plate 53 (e.g., a metal plate or a plate made of other rigid material) located at the inner top section of container 1 to support cable 51 at the top section of container (1) to ensure a proper compression/decompression of container (1). Controls such as a switch or variable speed controller enable to start and stop the motor 52 and adjust the speed and direction of rotation. Overall, this arrangement provides a reliable and efficient method for controlling and supporting the compression/decompression of container (1) by the movement of cable 51.

The pulley 55 can be attached to a shaft of motor 52 using a suitable coupling. The motor 52 and pulley 55 must be matched to meet the required speed and torque specifications of the load being moved (i.e., the container body), the distance it needs to be moved for compression/decompression, and the speed and torque required. Motor 52 and pulley 55 are located at the bottom section of container (1), and may be located within a dedicated compartment, such as compartment (54).

All the above will be better understood through the following illustrative and non-limitative implementation examples.

According to some embodiments, device (10) can be implemented in a water surrounding. For example, a floating facility above water (ship, gas rig, etc.) or any other floating facility that contains a download cable and on it and an electrical communication node connected between a generator above the water and the facility that is immersed in the water.

The device contains a weight, and in the upper part is a gas tank that can be decompressed and expanded. The gas tank has an additional tank that can hold gas at a higher pressure and drain the gas that is in the shrinking tank. When the gas tank is in its decompressed state, the entire device "wants" to descend toward the seabed.

The upper rig allows the lower rig to "fall" as it generates electricity from the fall from the force of gravity. When the device has finished falling to a predetermined height, the gas tank at the top of the device receives a command to inflate. Gas pressure is released from the pressure tank and inflates the tank. At this time, the device "wants" to float again, and the knot of cables gathers it up almost without investing energy. When the device reaches the upper end, the gas is again pumped into the pressure tank, and the main tank shrinks again, and the device becomes heavier than the water so it can be dropped repeatedly. According to an embodiment of the invention, at the end of the upper connection, there should be a generator that can generate electricity from the fall and a motor that can lift the device at the end of the fall.

According to some embodiments of the invention, device (10) can be integrated into a structure situated at a height relative to the ground level. The structure is linked through a cable node that contains a download cable and an electrical/communication node.

On the upper side of device (10), a generator is present, which can be connected through a gear/flywheel mechanism. On the lower side, compressible containers containing gas lighter than air, such as helium or hydrogen, are placed. The compressible containers are compressed, which causes them to fall due to gravity. As they fall, the cable drives the generator to generate electricity.

Once device (10) completes its fall stage, the gas pressure is released from the compressible containers, causing them to expand to atmospheric volume. The expansion causes compressible containers to rise or float, and the cable collects it to the top of the structure with minimal energy investment.

When the compressible containers reach the top of the facility, they are commanded to compress using an internal pump or mechanical contraction of the containers. Consequently, the compressible containers can be repeatedly dropped to generate energy.

As will be appreciated by the skilled person, the arrangement described in the figures results in a system that is capable of providing renewable energy by utilizing an energy converting device based on the buoyancy principle and the gravity force at every available surface, either on a solid ground or installed on a floating water facility.

All the above descriptions and examples have been given for the purpose of illustration and are not intended to limit the invention in any way. There are many applications and architectures upon which the same basic purpose, function, and operation can be achieved by altering the general system and device described herein. Therefore, it is understood that the present invention shall include all deviations of this design and reference the same herein and that the illustrative design described herein is just one possible design, function, use, and operation of the fundamental invention.

The invention claimed is:

1. An energy converting device, comprising:
   a) a stationary vertical structure having a vertical post member;
   b) one or more compressible and expandable containers adapted to support a "lighter-than-air" gas, wherein the compression/decompression of the gas within each container is done by using a control mechanism that is adapted to force/control the compression and expansion of each container;
   c) a supporting base adapted to hold the one or more containers, wherein said supporting base is configured to vertically slide along said post member, either in a downward or an upward direction with respect to a compressed state or decompressed state of the "lighter-than-air" gas.

2. The device according to claim 1, wherein the "lighter-than-air" gas is helium or other suitable gas.

3. The device according to claim 1, wherein during the compressed state the one or more containers fall under the gravity force, and during the decompressed state, a buoyancy force causes the one or more containers to move in the upward direction.

4. The device according to claim 3, wherein during the fall, the gravitational energy, which is initially related to the release height of the one or more containers, is converted to kinetic energy.

5. The device according to claim 4, the device is configured to convert the kinetic energy obtained from the gravitational energy into electrical energy.

6. The device according to claim 1, wherein the compression/decompression of the gas within containers is performed by an electro-mechanical/mechanical mechanism that is connected to the containers to control the compression and expansion of each container.

7. The device according to claim 6, wherein the mechanism comprises a pump adapted to compress the gas into an inner chamber by utilizing the compression/expansion capabilities of the containers.

8. The device according to claim 6, wherein the mechanism comprises a cable arrangement located within each container and is adapted to physically control the compression/expansion of the container to force/control the compression/expansion of the gas.

\* \* \* \* \*